3,686,153
PROCESS FOR THE PREPARATION OF LINEAR HIGH MOLECULAR WEIGHT COMPOUNDS
Hisatake Ono, Syu Watarai, and Chiaki Osada, all of 105 Ohaza Mizonuma, Asaka-shi, Saitama, Japan
No Drawing. Filed Oct. 19, 1970, Ser. No. 82,218
Claims priority, application Japan, Oct. 17, 1969, 44/83,028
Int. Cl. C08f 7/12, 15/16, 15/22
U.S. Cl. 260—85.5 R        7 Claims

ABSTRACT OF THE DISCLOSURE

A high molecular weight polymeric compound represented by the following recurring unit

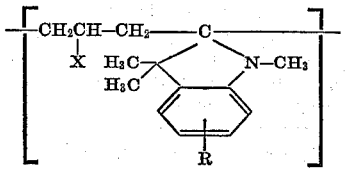

wherein R is selected from the group consisting of a hydrogen atom, a halogen atom, an alkyl group having 1 to 4 carbon atoms, —OR' and —COOR', in which R' is an alkyl group having from 1 to 4 carbon atoms, is disclosed. A process for the preparation of these compounds is also disclosed.

BACKGROUND OF THE INVENTION

(1) Field of the invention

This invention relates to a process for the preparation of linear high molecular weight compounds. More particularly, it is concerned with a process for the preparation of copolymers of a monomer having an enamine structure with an electrophilic olefin.

The monomer having an enamine structure which is used in the process of the present invention is a 1,3,3-trimethyl-2-methyleneindoline derivative represented by the general formula

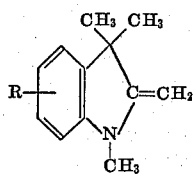

(I)

wherein R is a hydrogen atom, a halogen atom, a lower alkyl group such as methyl, ethyl, propyl or butyl, —OR' or —COOR' in which R' is a lower alkyl group such as methyl, ethyl, propyl or butyl.

(2) Description of the prior art

Although the compound of the above general formula is well known as an intermediate in the synthesis of dyes, the compound is not known to have been used as an integral part of a linear high molecular weight chain formed through its exomethylene group. These derivatives have had no attention in the art of the synthesis of high molecular weight compounds.

Only a few examples of the use of enamines as vinyl monomers, namely, the synthesis of a copolymer of N-vinylindole with indole having recurring units represented by the formula

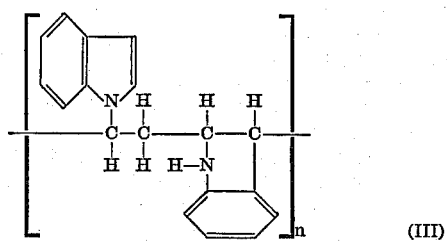

(III)

as disclosed in Macromolecules, 2, 82 (1969), and the synthesis of polyamides by the reaction between an enamine and a diisocyanate according to the equation

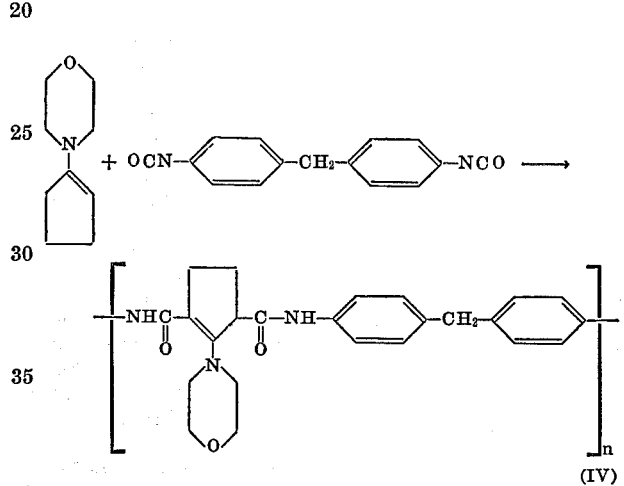

(IV)

as disclosed in Die Macromolecular Chemie, 108, 1 (1967).

It is disclosed in Journal of Chemical Society, 1964, 2165 that an enamine reacts with an electrophilic olefin to form a cyclobutane as illustrated by the following equation

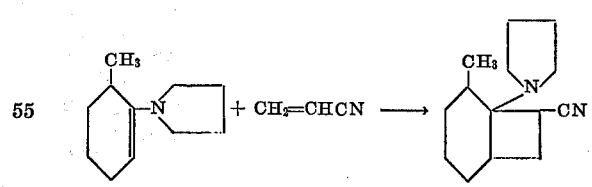

However, there is no description of the formation of high molecular weight compounds, and the polymer prepared by the process of the invention and represented by the general Formula II given hereinafter has not been obtained until our investigations.

DESCRIPTION OF THE INVENTION

We have now found that a copolymer having recurring units of the formula

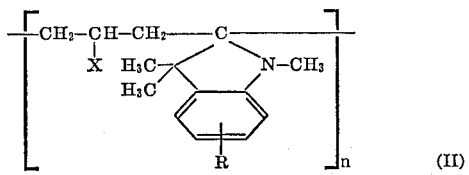

wherein X represents CN or COOR', and wherein R and R' have the same meanings as described above with respect to the general Formula I by heating a mixture of the above Compound I with an electrophilic olefin, such as acrylonitrile or an acrylic acid ester, in any desired proportion in the presence of a free radical polymerization initiator, such as azobisisobutyronitrile.

The high molecular weight compound having recurring units of the general Formula II contains a novel heterocyclic ring unknown in the art.

DETAILED DESCRIPTION OF THE INVENTION

The enamine of the general Formula I suitably used in the process of the present invention includes those as described in the following Table 1:

TABLE 1

| R: | Boiling point |
|---|---|
| H | 116.5° C./15 mm. Hg. |
| Cl | 129° C./6 mm. Hg. |
| $OCH_3$ | 132° C./6 mm. Hg. |
| $COOC_2H_5$ | 140° C./4 mm. Hg. |
| $CH_3$ | 129° C./8 mm. Hg. |

The electrophilic olefin suitably used in the process of this invention includes acrylonitrile, methyl acrylate, ethyl acrylate and N-butyl acrylate.

Various copolymers can be obtained by varying the combination and proportion of the two groups of monomers, and the copolymerization can be carried out in a suitable solvent such as, e.g., dimethylformamide, dioxane, tetrahydrofuran, dimethylacetamide, benzene and toluene. Generally, the level of the monomers in the solvent ranges from 10% by weight up to 100% by weight corresponding to copolymerization in the absence of a solvent.

As the polymerization initiator suitably used are azobis compounds, such as azobispropionitrile, azobisisobutyronitrile and azobisvaleronitrile, and azo and diazo compounds, such as diazoaminobenzene, nitrosoacylarylamines, azothioethers and para nitrosobenzene diazonium salts. Peroxide compounds unfavorably have a tendency to discolor the enamines to reddish purple, as well as oxygen in air. The initiators are generally used at a level of from 0.01 to 5% by weight.

The mixture of the enamine with the olefin, for example, less than 1 mole to 1 mole of olefin, is heated in the presence or absence of a solvent at from about 80 to 95° C. for about 3 hours in the presence of the polymerization initiator in a stream of gaseous nitrogen or under a degassed condition to effect copolymerization. After completion of the reaction, the solution with an increased viscosity is poured into methanol with vigorous stirring to precipitate the polymerizate. The polymerizate thus obtained is purified by dissolving it in tetrahydrofuran and re-precipitating it in methanol.

The polymer prepared in the process of the present invention can be converted into a tough coating film by incorporating a plasticizer therein.

The polymer is expected to have the capacity of transmitting an electric charge by virtue of the heterocyclic ring in the side chain. In fact, its electrical characteristcs vary on exposure to light, so that it is applicable for use in electrophotography as an organic photoconductor. It can also be used as an agent for rendering acrylic fibers dye receptive.

It was identified by its infrared absorption spectrum that the polymerizate prepared in the process of the present invention is a copolymer of an enamine with an olefin. The characteristic peak of absorption for the exo-methylene in an enamine at 1645 cm.$^{-1}$ is extinguished by the polymerization. In addition, in copolymerization with acrylonitrile, absorption at 2230 cm.$^{-1}$ by the CN and absorption of aromatic nucleus in the indolin occurs and, in copolymerization with acrylate esters, an absorption at 1720 cm.$^{-1}$ by an ester linkage is observed.

The present invention will now be illustrated in greater detail by reference to the following examples which are to be considered only as illustrative and not limiting.

EXAMPLE 1

Preparation of a polymer of the general Formula II in which R=H and X=CN.

Into a three-necked flask of a 100 ml. capacity there were charged 42 g. of 1,3,3-trimethyl-2-methyleneindoline, 26 g. of acrylonitrile and 0.1 g. of azobisisobutyronitrile, and the charge was stirred at 85° C. for 3 hours with the passing of gaseous nitrogen through the flask. The liquid mixture increased in viscosity and became syrupy. The mixture was then poured into 2 liters of vigorously agitated methanol to precipitate the polymer. The unreacted monomers were dissolved in the methanol. The precipitate was recovered by filtration and dried to obtain 21 g. of a copolymer. Because of pink color, the copolymer was reprecipitated from a tetrahydrofuran-methanol system to obtain a colorless copolymer with an intrinsic viscosity, as measured at 30° C. in tetrahydrofuran, of 0.175. Differential thermal analysis results were: 57° C.—endothermic; 222° C.—fever and decomposition.

EXAMPLE 2

Preparation of a polymer of the general Formula II in which R=H, X=CN.

Into a 50 ml., three-necked flask there were charged 5.7 g. of 1,3,3-trimethyl-2-methyleneindoline, 17.5 g. of acrylonitrile, 0.02 g. of azobisisobutyronitrile and 10 ml. of dimethylformamide, and the charge was stirred at 90° C. for 3 hours with the passing of gaseous nitrogen through the flask. After completion of the reaction, the charge was poured into methanol to precipitate a polymer. The yield was 1.89 g. and the intrinsic viscosity at 30° C. in THF was 0.123.

EXAMPLE 3

Preparation of a polymer of the general Formula II in which R=H, X=CN.

Into a glass tube there were charged 3 g. of 1,3,3-trimethyl-2-methyleneindoline, 4.5 g. of acrylonitrile and 0.01 g. of azobisisobutyronitrile. After repeated freezing deaeration, the tube was sealed under a reduced inner pressure of 10$^{-4}$ mm. Hg and put in a thermostat at 95° C. for 3 hours. The tube was then opened and the charge was poured into methanol to obtain 3.8 g. of a polymer having an intrinsic viscosity of 0.160 (30° C., in THF).

EXAMPLE 4

Preparation of a polymer of the general Formula II in which R=H, X=$COOC_2H_5$.

A mixture of 4 g. of 1,3,3-trimethyl-2-methyleneindoline, 5 g. of ethyl acrylate and 0.1 g. of azobisisobutyronitrile was processed in a manner similar to Example 2 to obtain 4.8 g. of a polymer having an intrinsic viscosity of 0.100 (30° C. in THF). Differential thermal analysis: 62° C.—endothermic, 92° C. fever and dissolution.

EXAMPLE 5

Preparation of a polymer of the general Formula II in which R=H, X=$COOCH_3$.

A mixture of 6.3 g. of 1,3,3,-trimethyl-2-methyleneindoline, 6.3 g. of methyl acrylate, 20 ml. of dimethylformamide, and 0.02 g. of azobisisobutyronitrile was processed in a manner similar to Example 2 to obtain 4.3 g. of polymer.

EXAMPLE 6

Preparation of a polymer of the general Formula II in which R=OCH₃, X=CN.

A mixture of 5 g. of 1,3,3-trimethyl-5-methoxy-2-methyleneindoline, 5 g. of acrylonitrile, 30 ml. of dimethylformamide and 0.02 g. of azobisisobutyronitrile was processed in a manner similar to Example 2 to obtain 2.4 g. of a polymer.

EXAMPLE 7

Preparation of a polymer of the general Formula II in which R=COOCH₃, X=CN.

A mixture of 4 g. of 1,3,3-trimethylene-5-carboethoxy-2-methyleneindoline, 5 g. of acrylonitrile, 20 ml. of dimethylformamide and 0.02 g. of azobisisobutyronitrile was processed in the manner as in Example 2 to obtain 2.5 g. of a polymer.

EXAMPLE 8

Preparation of a polymer of the general Formula II in which R=CH₃, X=CN.

A mixture of 7 g. of 1,3,3,5-tetramethyl-2-methyleneindoline, 8 g. of acrylonitrile, 20 ml. of dimethylformamide and 0.02 g. of azobisisobutyronitrile was processed in a manner similar to Example 2 to obtain 3.7 g. of a polymer.

EXAMPLE 9

Preparation of a polymer of the general Formula II in which R=Cl, X=COOC₂H₅.

A mixture of 3 g. of 1,3,3-trimethyl-5-chloro-2-methyleneindoline, 6 g. of ethyl acrylate and 0.001 g. of azobisisobutyronitrile was processed in a manner similar to Example 3 to obtain 2.3 g. of a polymer.

What is claimed is:

1. A high molecular weight polymeric compound represented by the following recurring unit,

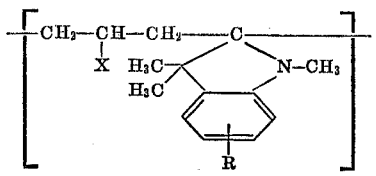

wherein R is selected from the group consisting of a hydrogen atom, a halogen atom, an alkyl group having from 1 to 4 carbon atoms, —OR' and —COOR, in which R' is an alkyl group having from 1 to 4 carbon atoms, and in which X is selected from the group consisting of CN and COOR'.

2. A process for preparing linear high molecular weight compounds which comprises copolymerizing an enamine having the general formula

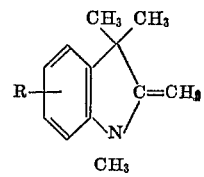

wherein R is selected from the group consisting of a hydrogen atom, a halogen atom, an alkyl group having from 1 to 4 carbon atoms, —OR' and —COOR' in which R' is an alkyl group having from 1 to 4 carbon atoms with an electrophilic olefin selected from the group consisting of acrylonitrile, methyl acrylate, ethyl acrylate and n-butyl acrylate in the presence of an azo-type polymerization initiator.

3. The process as claimed in claim 2 wherein said electrophilic olefin is acrylonitrile.

4. The process as claimed in claim 2, wherein said azo-type polymerization initiator is selected from the group consisting of an azobisnitrile compound, an azo compound and a diazo compound.

5. The process as claimed in claim 2, wherein said copolymerization is carried out in a solvent selected from the group consisting of dimethylformamide, dioxane, tetrahydrofuran, dimethylacetamide, benzene and toluene.

6. The process as claimed in claim 4 wherein said initiator is used in an amount of 0.01 to 5% by weight.

7. The process as claimed in claim 4 wherein said initiator is selected from the group consisting of azobispropionitrile, azobisisobutyronitrile, azobisvaleronitrile, diazoaminobenzene, nitrosoacrylarylamines, azothioethers, and paranitrosobenzene diazonium salts.

References Cited

UNITED STATES PATENTS 2,475,161   7/1949   Szmant _____ 260—88.3
2,828,292   3/1958   Coover _____ 260—85.5 B HARRY WONG, JR., Primary Examiner U.S. Cl. X.R.

8—55; 96—1.5; 117—138.8, 140; 260—30.4, 32.6, 33.6, 47 U, 80.3 R, 86.1 N, 88.3 R, 326.11

UNITED STATES PATENT OFFICE
CERTIFICATE OF CORRECTION

Patent No. 3,686,153          Dated August 22, 1972

Inventor(s) Hisatake Ono et al

It is certified that error appears in the above-identified patent and that said Letters Patent are hereby corrected as shown below:

In The Heading:

The name of the Assignee was omitted. Should read:

--Assignee: Fuji Photo Film Co., Ltd.--

Signed and sealed this 27th day of November 1973.

(SEAL)
Attest:

EDWARD M. FLETCHER, JR.      RENE D. TEGTMEYER
Attesting Officer                Acting Commissioner of Patents

FORM PO-1050 (10-69)